US010317519B2

(12) United States Patent
Rohani et al.

(10) Patent No.: US 10,317,519 B2
(45) Date of Patent: Jun. 11, 2019

(54) SYSTEMS AND METHODS FOR ENVIRONMENT SENSING USING RADAR

(71) Applicants: Mohsen Rohani, Gatineau (CA); Song Zhang, Ottawa (CA)

(72) Inventors: Mohsen Rohani, Gatineau (CA); Song Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 541 days.

(21) Appl. No.: 15/262,634

(22) Filed: Sep. 12, 2016

(65) Prior Publication Data

US 2018/0106896 A1  Apr. 19, 2018

Related U.S. Application Data

(60) Provisional application No. 62/323,342, filed on Apr. 15, 2016.

(51) Int. Cl.
*G01S 13/42* (2006.01)
*G01S 13/89* (2006.01)
(Continued)

(52) U.S. Cl.
CPC ............ *G01S 13/426* (2013.01); *G01S 13/89* (2013.01); *G01S 13/931* (2013.01); *G01S 13/87* (2013.01);
(Continued)

(58) Field of Classification Search
CPC .................................................... G06T 7/231
See application file for complete search history.

(56) References Cited

U.S. PATENT DOCUMENTS

| 5,189,424 A | * | 2/1993 | Brown | ................... G01S 13/87 |
| | | | | 342/25 C |
| 6,047,234 A | * | 4/2000 | Cherveny | .............. G01C 21/26 |
| | | | | 340/988 |

(Continued)

FOREIGN PATENT DOCUMENTS

| CN | 2365679 Y | 2/2000 |
| CN | 101008571 A | 8/2007 |

(Continued)

OTHER PUBLICATIONS

Werber, Klaudius et al, Automotive Radar Gridmap Representations (2015). 2015 IEEE MTT-S International Conference on Microwaves for Intelligent Mobility, Heidelberg: (IEEE) Institute of Electrical and Electronics Engineers.

(Continued)

*Primary Examiner* — Bernarr E Gregory

(57) ABSTRACT

A method and system for generating a three dimensional map of an environment based on information acquired by radar. The system includes a ground-based vehicle, and a scanning radar, or combination of radars, that scans the surrounding environment in one or more vertical planes or along azimuth angles. The radar may be an electrical beam steering and scanning radar or a combination electrical beam scanning radar and mechanical scanning radar. Dynamic objects within the environment may also be identified and removed with the remaining static objects being used to generate a three dimensional map of the surrounding environment and to perform localization within the three dimensional map.

20 Claims, 8 Drawing Sheets

(51) Int. Cl.
　　　*G01S 13/93* 　　(2006.01)
　　　*G01S 13/87* 　　(2006.01)
　　　*G01S 13/00* 　　(2006.01)
(52) U.S. Cl.
　　　CPC ............... *G01S 2013/9382* (2013.01); *G01S 2013/9389* (2013.01)

(56) References Cited

U.S. PATENT DOCUMENTS

| | | | | |
|---|---|---|---|---|
| 6,526,352 | B1 * | 2/2003 | Breed | G01S 13/931 342/357.31 |
| 8,913,823 | B2 * | 12/2014 | Bian | G06T 5/005 382/164 |
| 9,103,671 | B1 * | 8/2015 | Breed | G01S 13/931 |

FOREIGN PATENT DOCUMENTS

| | | |
|---|---|---|
| CN | 101493526 A | 7/2009 |
| CN | 102301255 A | 12/2011 |
| CN | 103617647 A | 3/2014 |
| CN | 103890606 A | 6/2014 |
| CN | 103941750 A | 7/2014 |
| CN | 104764457 A | 7/2015 |
| CN | 104914863 A | 9/2015 |
| EP | 1703466 A2 * | 9/2006 ............ G06T 7/231 |
| JP | 2005018548 A | 1/2005 |

OTHER PUBLICATIONS

Brooker, Graham et al (2007). Millimetre Wave 3D Imaging for Industrial Applications. AusWireless 2007 Second International Conference on Wireless Broadband and Ultra Wideband Communications, Sydney: (IEEE) Institute of Electrical and Electronics Engineers.

Maddern, Will et al (2015). Leveraging Experience for Large-scale LIDAR Localization in Changing Cities, 2015 IEEE International Conference on Robotics and Automation, Seattle: (IEEE) Institute of Electrical and Electronics Engineers, pp. 1684-1691.

* cited by examiner

SYSTEMS AND METHODS FOR ENVIRONMENT SENSING USING RADAR

CROSS-REFERENCE

This application claims the benefit of priority to U.S. Provisional Patent Application No. 62/323,342 filed Apr. 15, 2016 entitled "Systems and Methods for Environment Sensing Using Radar" which is hereby incorporated by reference in its entirety into the Detailed Description of Example Embodiments herein below.

FIELD

At least some example embodiments relate to sensing, detection, mapping, and/or localization using radar.

BACKGROUND

Accurate high definition maps of various environments are used for various applications including autonomous vehicles, robotics, aircraft, drones, agriculture, civil engineering, geology, soil science, and mining. In certain applications, environmental mapping is also used for enabling localization of an object.

Various methods presently exist for building high definition digital maps of an environment including methods and systems that rely on light detection and ranging ("LIDAR") as well as camera/vision based sensors and systems ("vision"). LIDAR uses ultraviolet, visible or near infrared light to image objects. LIDAR systems are accurate and can be used to provide a high resolution two or three dimensional map of an environment. Wavelengths used in LIDAR systems may vary to suit the target and can range from approximately 10 micrometers to the ultraviolet range (e.g., approximately 250 nanometers).

Vision systems use visible light to image objects, are cheaper than LIDAR systems and can provide color information about an environment.

A combination of LIDAR and vision may be used to enhance the capabilities of three dimensional mapping and localization. However, existing limitations of each of LIDAR and vision systems, including vulnerability to weather conditions for example, persist.

Additional difficulties with existing systems may be appreciated in view of the Detailed Description of Example Embodiments, below.

SUMMARY

Example embodiments are directed to a method and system for generating a three dimensional map of an environment based on information acquired by radar sensors that scan the surrounding environment along azimuth angles or in one or more vertical planes In some configurations, the system includes a scanning radar, or combination of radars, that scans the surrounding environment in one or more vertical planes at one or more fixed azimuth angles. In some configurations, the system also includes a scanning radar, or combination of radars, that scan the surrounding environment along azimuth angles at one or more fixed elevation angles. The radar may be an electrical beam steering and scanning radar or a combination electrical beam scanning radar and mechanical scanning radar. When scanning along azimuth angles at one or more fixed elevation angles, the radar can scan by performing a conceptual row-by-row scan at a fixed azimuth angle in a region or field of interest, for example initially a zero degree elevation angle. Depending on the field of interest, the scanner may be raised to different elevations and conceptual row-by-row scans completed along azimuth angles at one or more fixed elevation angles. The angular elevations will vary depending on the field of interest and the application, but may be intervals of for example 5 degrees, 10 degrees or the like. Similarly, in the vertical planes, the radar may scan by performing a conceptual column-by-column sweep of a desired region or field of interest. The vertical plane scan may then be varied by varying a fixed azimuth angle of each scan, for example to scan the same region or field of interest. Depending on the desired region of interest, up to a 360 degree scan of the entire surrounding environment may be conducted. Partial sectors can also be scanned, which are less than 360 degrees, for example, depending on the region of interest.

Dynamic objects within the environment may also be identified and removed with the remaining static objects being used to generate a three dimensional map of the surrounding environment which may have object localization applications.

Further, radar is an electromagnetic wave which can pass through some materials like plastics, depending on the wavelength of the radar used. Therefore it can be possible to place radar sensors in an internal location such as behind the bumper of a vehicle, or in the body of a vehicle.

Since the main sensor used here is radar, mapping, object detection and localization would not be adversely affected by weather conditions or mud on the sensor.

In an example embodiment, there is provided a sensing system for a ground-based vehicle. The sensing system comprises at least one radar system mountable to the ground-based vehicle, wherein the at least one radar system emits radio waves to scan along azimuth angles or in one or more vertical planes. In some configurations, the radar system emits radio waves to scan along azimuth angles at one or more fixed elevation angles. In some configurations, the at least one radar system emits radio waves to scan in one or more vertical planes at one or more fixed azimuth angles.

In another example embodiment, there is provided a method for radar sensing from a ground-based vehicle using at least one radar system. The method includes emitting radio waves from the radar system mountable to the ground-based vehicle to scan along azimuth angles and along one or more vertical planes. In some configurations, the radar system emits radio waves to scan along azimuth angles at one or more fixed elevation angles. In some configurations, the at least one radar system emits radio waves to scan in one or more vertical planes at one or more fixed azimuth angles.

In another example embodiment, there is provided a radar sensing system for a ground-based vehicle. The sensing system comprises: at least one radar system mountable to the ground-based vehicle wherein the radar system emits radio waves to scan along first angular coordinates at one or more fixed second angular coordinates, wherein the first angular coordinates are perpendicular to the second angular coordinates, memory, and a processor configured to execute computer instructions. The computer instructions cause the processor to generate a map of an environment based from at least electromagnetic radiation received by the radar system, identify and remove dynamic objects from the environment, and generate a second map, of a static environment.

BRIEF DESCRIPTION OF THE DRAWINGS

Embodiments will now be described by way of examples with reference to the accompanying drawings, in which like reference numerals may be used to indicate similar features, and in which.

DETAILED DESCRIPTION OF EXAMPLE EMBODIMENTS

Figure 1:
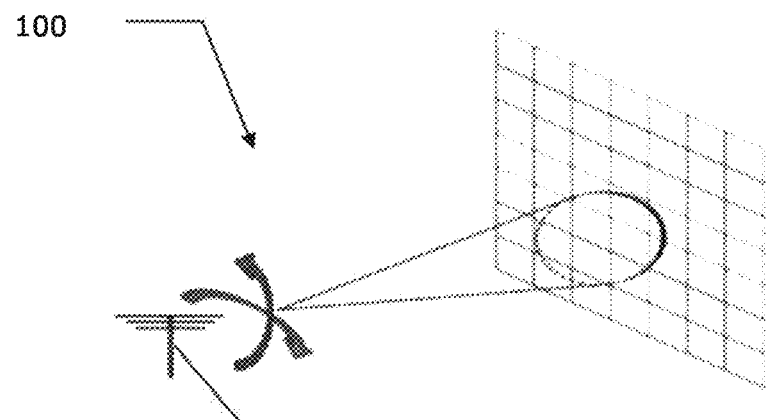
FIG. 1 is a diagrammatic view of an example sensing system, in accordance with an example embodiment.

LIDAR and vision based systems can be used to generate map data. However, LIDAR systems have some limitations. For example, they are vulnerable to weather conditions. In addition, the wavelengths used in LIDAR systems are often not long enough to penetrate environmental contaminants such as dust and are attenuated by adverse weather conditions such as snow and fog. In addition, LIDAR system performance may be degraded if there is dirt, mud or some other physical contaminant on the LIDAR sensor. Accordingly, systems based on LIDAR exhibit poor performance in adverse weather conditions and LIDAR is therefore not a reliable sensor for localization in all conditions.

Vision systems are cheaper than LIDAR systems. However, they possess the same weaknesses in addition to being less accurate and being vulnerable to poor lighting conditions in the scanning environment. As a result, one challenge with environment sensing, detection and mapping is the need for a high resolution method of mapping an environment that can be deployed in various weather conditions and which is not susceptible to contamination of the sensor.

Furthermore, for example, sensors like LIDAR and vision based sensors can be based on light reflection. Therefore they need to have clear line of sight and are often therefore mounted externally.

Radar mapping systems use radio waves to determine the range, angle or velocity of objects or environment. Radar systems are often composed of a transmitter that emits radio waves (radar signals) in specified directions. When these come into contact with an object, some are reflected or scattered in many directions, and some are reflected back towards the transmitter. The radar system also includes a receiver that may be in the same location as the transmitter, and which captures the radar signals reflected by the environment. Radar systems may also include signal processors which may include digital signal processors for recovering useful radar signals or to interpret the received radar signals.

Radio waves are only weakly absorbed by the media through which they pass and therefore radar can be used to detect objects at relatively long ranges-ranges at which some other electromagnetic wavelengths are too strongly attenuated. In addition, such weather phenomena as fog, clouds, rain, falling snow, and sleet that block visible light are usually transparent to radio waves and accordingly radar can operate in adverse weather conditions. Furthermore, radio wave systems are more reliable than ambient visual systems, where lighting conditions can prove unreliable.

Some conventional methods exist for environmental mapping using radar. One such example is occupancy grid mapping by millimeter wave (MMW) radars which use long wavelengths to obtain renderings of the environment for mapping and localization in autonomous vehicle, drones, or civil engineering applications.

However, occupancy grid mapping scans the environment using radar systems that scan only in the horizontal plane. This produces a two dimensional map where each cell of the grid represents the probability of the cell being occupied. As a result, occupancy grid mapping cannot provide quality information about the three dimensional structure of the environment, or the size and shape of sensed objects within the environment.

Example embodiments are directed to a method and system for generating a three dimensional map of an environment based on information acquired by radar sensors that scan the surrounding environment along azimuth angles or in one or more vertical planes In some configurations, the system includes a scanning radar, or combination of radars, that scans the surrounding environment in one or more vertical planes at one or more fixed azimuth angles. In some configurations, the system also includes a scanning radar, or combination of radars, that scan the surrounding environment along azimuth angles at one or more fixed elevation angles. The radar may be an electrical beam steering and scanning radar or a combination electrical beam scanning radar and mechanical scanning radar.

In an example embodiment, there is provided a sensing system for a ground-based vehicle. The sensing system comprises at least one radar system mountable to the ground-based vehicle, wherein the at least one radar system emits radio waves to scan along azimuth angles or in one or more vertical planes. In some configurations, the radar system emits radio waves to scan along azimuth angles at one or more fixed elevation angles. In some configurations, the at least one radar system emits radio waves to scan in one or more vertical planes at one or more fixed azimuth angles.

In another example embodiment, there is provided a method for radar sensing from a ground-based vehicle using at least one radar system. The method includes emitting radio waves from the radar system mountable to the ground-based vehicle to scan along azimuth angles and along one or more vertical planes. In some configurations, the radar system emits radio waves to scan along azimuth angles at one or more fixed elevation angles. In some configurations, the at least one radar system emits radio waves to scan in one or more vertical planes at one or more fixed azimuth angles.

In another example embodiment, there is provided a radar sensing system for a ground-based vehicle. The sensing system comprises: at least one radar system mountable to the ground-based vehicle wherein the radar system emits radio waves to scan along first angular coordinates at one or more fixed second angular coordinates, wherein the first angular coordinates are perpendicular to the second angular coordinates, memory, and a processor configured to execute computer instructions. The computer instructions cause the processor to generate a map of an environment based from at least electromagnetic radiation received by the radar system, identify and remove dynamic objects from the environment, and generate a second map, of a static environment.

Figure 3:
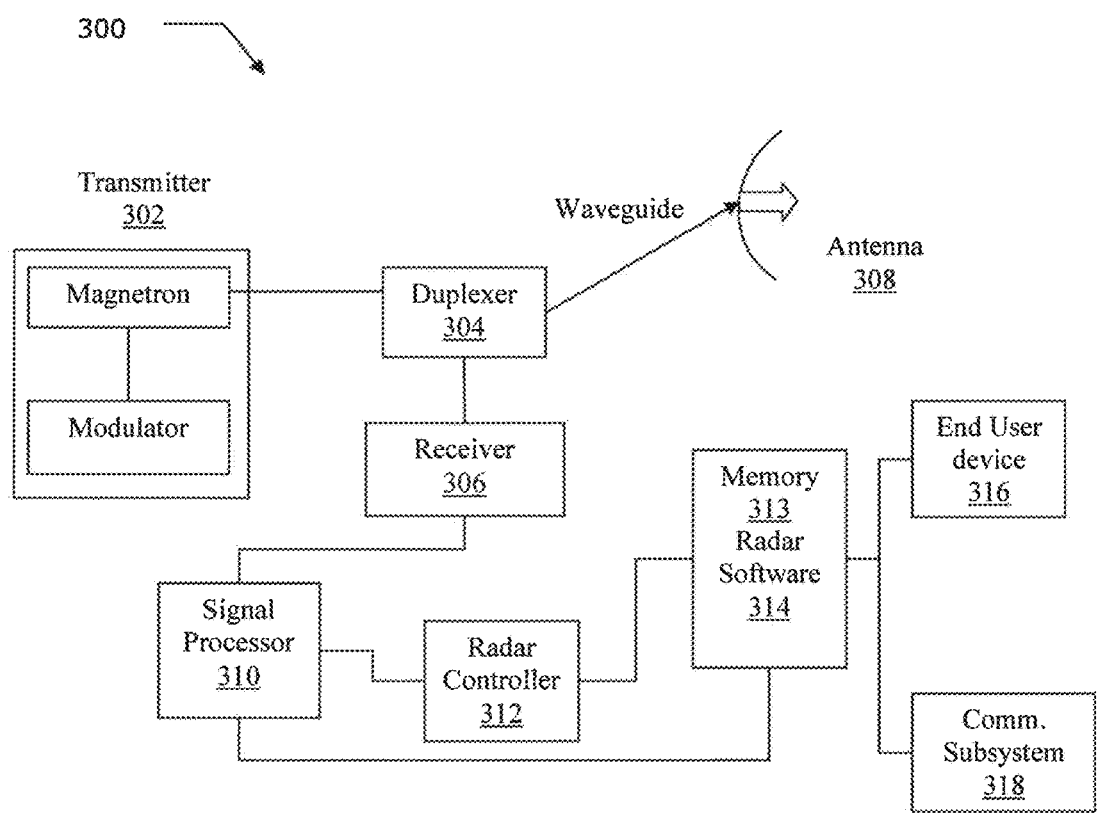
FIG. 3 is a block diagrammatic view of an example radar system, in accordance with an example embodiment.

Reference is first briefly made to FIG. 3, which shows a block diagrammatic view of an example radar system 300, in accordance with an example embodiment. The radar system 300 comprises at least one transmitter 302, at least one duplexer 304, at least one receiver 306, and at least one antenna 308. The antenna 308 may be rotated to direct the transmission of the radar signals and to facilitate the capture of reflected radar signals. The antenna 308 may be electrically steered, for example using phase shifting or frequency shifting, as is understood in the art. The antenna 308 can be directed so as to control the transmission of the radar signals and to facilitate the capture of reflected radar signals. The antenna 308 can be a dipole antenna and/or a grid-based antenna, for example, depending on the particular application. The duplexer 304 is used to alternate the antenna 308 between the transmitter 302 and the receiver 306, so that the same antenna 308 can be used for both transmit and receive functions. The antenna 308 is electrically or conductively connected to the transmitter 302 and the receiver 306. In some other example embodiments, a different antenna 308 is used for transmitting than for receiving.

FIG. 1 illustrates an example sensing system 100 according to an example embodiment. The sensing system 100 may include a radar system 102 which is in operable connection to the radar transmitter 302 and receiver 306 (FIG. 3). The sensing system 100 may also include additional components of the radar system 300.

The sensing system 100 uses the radar transmitter 302 (FIG. 3) which controls the emitted radio signals in order to scan the surrounding environment in vertical and horizontal scanning patterns, for example, and uses the receiver 306 (FIG. 3) to receive the reflections from the environment.

The sensing system 100 may be configured to scan along azimuth angles at one or more fixed elevation angles and the vertical planes at one or more fixed azimuth angles. In an example embodiment, this may be performed using solely electrical beam steering, or may use a combination of electrical beam steering and mechanical steering. For example, the sensing system 100 can perform electrical beam scanning for varying elevation angles, and mechanical scanning for varying azimuth angles, or vice versa. In an example embodiment, the sensing system 100 can be configured to scan along the elevation angles and along the azimuth angles sequentially. In another example embodiment, the sensing system 100 is configured to scan along the azimuth angles and along the elevation angles concurrently.

Figure 2:
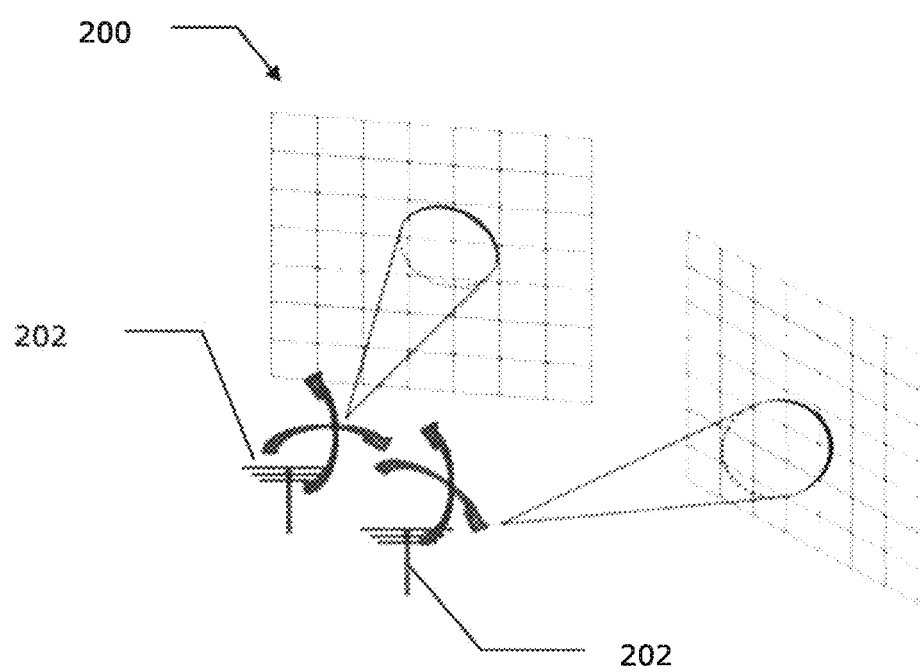
FIG. 2 is a diagrammatic view of another example sensing system, in accordance with another example embodiment.

FIG. 2 is a diagrammatic view of another example radar system 200, in accordance with another example embodiment. In this embodiment, the radar system 200 includes at least two radar systems 202 shown here, which can be operably connected to one or more transmitters 302 and receivers 306 (FIG. 3). For example, the two different radar systems 202 can be connected to shared or different transmitter(s) 302 and receiver(s) 306 (FIG. 3). The two radar systems 202 can be operated in combination to scan the surrounding environment and to improve the field of view of the radar system 200. In one example embodiment, both of the radar systems 202 are controlled to emit radio waves to perform scans along azimuth angles at one or more fixed elevation angles and the vertical planes at one or more fixed azimuth angles. In another example embodiment, one of the radar systems 202 is controlled to emit radio waves to perform scans along azimuth angles at one or more fixed elevation angles while the other radar system 202 is controlled to perform scans in the vertical plane at one or more fixed azimuth angles. The system 200 may also include additional components of the radar system 300.

In example embodiments, reference to scanning in any horizontal plane includes scanning along azimuth angles at a fixed elevation angle. Scanning in the vertical planes includes scanning along elevation angles at one or more fixed azimuth angles.

Referring again to FIG. 3, the radar system 300 includes a signal processor 310 which processes signals received from the receiver 306. The radar system 300 further includes a radar controller 312 which is operably connected and in communication with the components of the system 300 and which may use radar software 314 (stored on memory 313 of sensing system 100) to further process the signals received by the radar system 300 or to perform a radar scan. The signals may be used for generating 3D maps and for control or response by other subsystems for example. The signals may then be presented on various end user devices 316 which may be computer screens or other radar display units capable of displaying the signals processed by the radar system 300.

Referring again to FIG. 3, in relation to the systems 100, 200, the data received by the receiver 306 may be subsequently processed by a signal processor 310 based on commands received from the controller 312. The controller 312 can include at least one processor (such as a microprocessor or other digital signal processor) which controls the overall operation of the radar system 300. The controller 312 may interact with the subsystems of the object on or in which it is mounted such as input subsystems, output subsystems, electrical subsystems and electro-mechanical subsystems which may already be part of the object. Various forms of software may be used to send or execute commands including to perform a radar scan.

The radar controller 312 may have access to memory 313 which can store instructions and programs for operation of the controller 312. The controller 312 can be configured to receive and send communications to internal or external devices by way of one or more communication subsystems 318. The controller 312 may include at least one data recording process for storing in memory 313 signals, data or images captured from the receiver 306 and processed by the controller 312. The radar data can be processed to generate, for example, a three dimensional point cloud of the environment or a radar image of the environment, which can be stored to memory 313, sent to other devices, and/or used to produce signals for human readable output devices. This data can form the basis for a three dimensional map of the environment. The 3D map can be generated by the controller 312, or from a remote device in other example embodiments. In addition, multiple scans of the environment may be conducted to gather increased environmental detail and to generate a three dimensional map with more environmental features. The radar system 300 may also use polarimetric radars which can provide more features of the environment to be included in the three dimensional map of the environment. Further, Synthetic Aperture Radar (SAR) imaging, multispectral emission, and interferometry radar techniques can further be used to facilitate generating of the map.

The surrounding environment may include dynamic (moving) objects or static objects which subsequently move and which are often not intended to be included in the map. Dynamic objects are objects that are in the environment for only a short discrete time frame such as a moving object like a person or animal or other vehicle. In some embodiments, the undesired objects are removed so that a second (final) map is generated from the initial map to ensure the final map only includes static environmental features. The signal processor 310 may use software or other means to execute instructions to remove objects from the data signals received by the receiver 306. Information about dynamic objects within the environment may also be relevant to other applications such as for localization or navigation. In an embodiment, removal of dynamic objects is performed after all data is received by the receiver 306, wherein objects are identified and removed or otherwise not considered when generating the map. In some embodiments, removal of dynamic objects within the environment may not be necessary or object removal may not be necessary where there are no dynamic objects in the environment. Dynamic objects can be detected by, among other things, comparing map data from successive time slots to determine what objects are moving, and then the relevant data for such object removed from the map data or otherwise flagged within the data as relating to a dynamic object. In some examples, dynamic objects may be classed as such solely in dependence on detected stationary attributes of the object—for example a parked car may be classed as a dynamic object based on its size, shape, location and possibly other attributes. In some examples, dynamic objects may be classed as such based on their motion relative to the platform vehicle. For example, a car moving at the same speed as the platform vehicle may be classed as a dynamic object based on the relative difference in velocity between the car and the platform vehicle.

The remaining static objects within the environment are used to generate a three dimensional static map of the surrounding environment. This map can include all the static objects in an environment including both natural and artificial objects such as traffic signs, traffic lights, buildings, roads, trees, curbs and the like depending on the application and can be used for localization of the object on which the systems 100, 200, 300 is mounted and sensing of surrounding environmental features. Some example applications of the systems 100, 200, 300 include autonomous vehicles, robotics and civil engineering.

In addition, the systems 100, 200, 300 can include outputs (e.g. displays, heads-up displays, monitors, projectors, and/or speaker output) which include or display data about the environment such as the three dimensional map of the environment.

In an example embodiment, the radar system 300 can use an ultra wide band (UWB) radar that scans the environment in either the horizontal planes or vertical planes using a beam with a narrow beam width to increase resolution and reduce noise. The frequency and wavelengths of the radar system may be varied depending on the application. Further, multiple wavelengths can be used in order to gain additional information. Example wavelengths are provided in the following Table 1:

TABLE 1

Example Radar Frequency Bands

| Band name | Frequency range | Wavelength range | Application |
|---|---|---|---|
| HF | 3-30 MHz | 10-100 m | High frequency radars, Coastal radar systems, |
| VHF | 30-300 MHz | 1-10 m | Very high frequency radars, ground penetrating radars, geological or civil engineering |
| UHF | 300-1000 MHz | 0.3-1 m | Ultra high frequency, ballistic missile warning systems |

TABLE 1-continued

Example Radar Frequency Bands

| Band name | Frequency range | Wavelength range | Application |
|---|---|---|---|
| L | 1-2 GHz | 15-30 cm | Long range radar, air traffic control and surveillance |
| S | 2-4 GHz | 7.5-15 cm | Short wave radar, terminal air traffic control, long-range weather, marine radar |
| C | 4-8 GHz | 3.75-7.5 cm | Medium range radar, weather |
| X | 8-12 GHz | 2.5-3.75 cm | Missile guidance, marine radar, weather, medium-resolution mapping and ground surveillance |
| $K_u$ | 12-18 GHz | 1.67-2.5 cm | High resolution, satellite transponders |
| K | 18-24 GHz | 1.11-1.67 cm | Cloud detection, police radar |
| $K_a$ | 24-40 GHz | 0.75-1.11 cm | Mapping, short range, airport surveillance, photo radars |
| V | 40-75 GHz | 4.0-7.5 mm | Millimeter band |
| W | 75-110 GHz | 2.7-4.0 mm | Millimeter band, autonomous vehicles, imaging |

An object on which the sensing systems 100, 200 may be mounted, in example embodiments, can be a ground-based vehicle or moving object, or it may be mounted on a stationary object which may be fixed or which may be capable of being moved.

Figure 4:
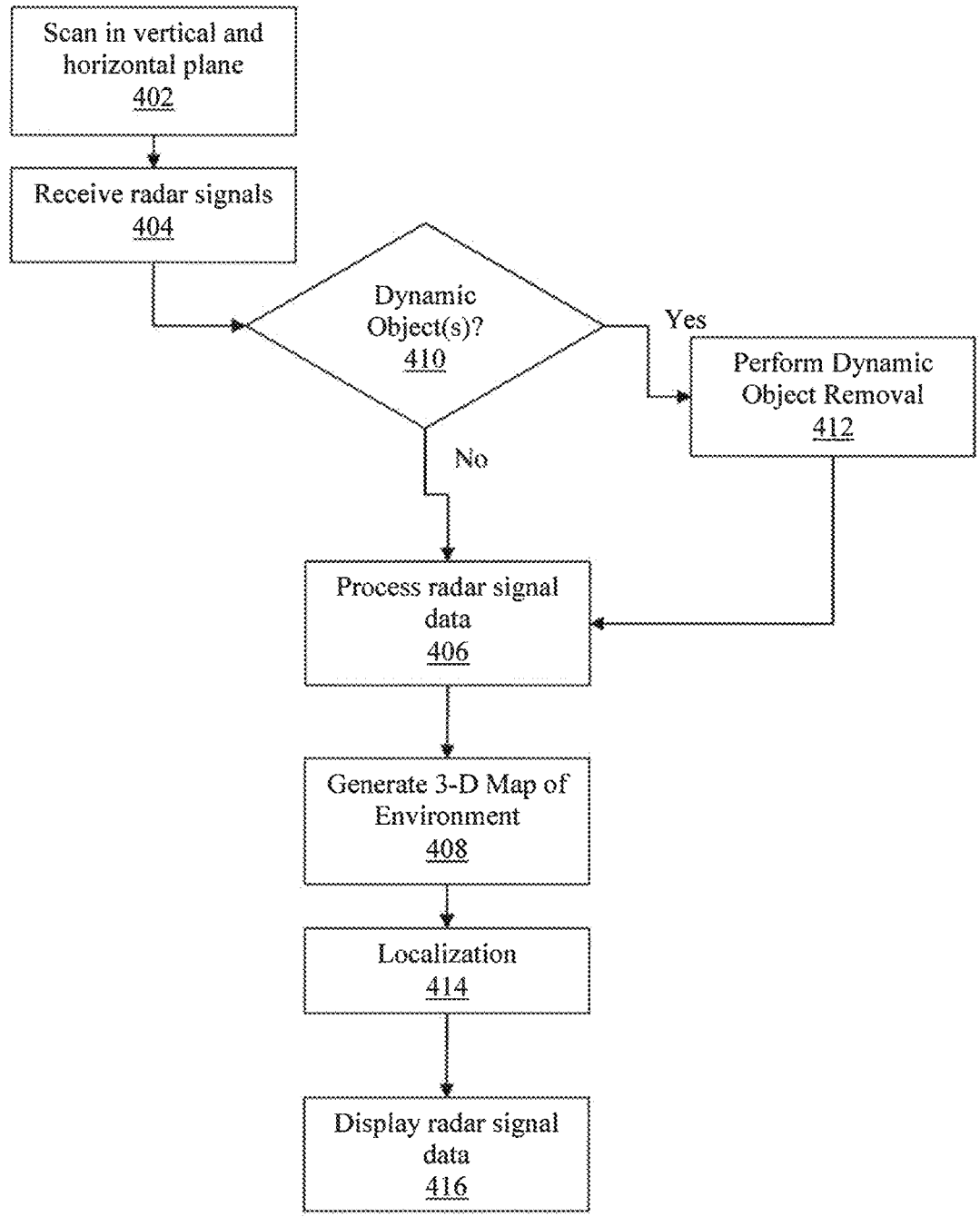
FIG. 4 illustrates a flow diagram for a method of operation of a sensing system to generate a three dimensional map of an environment, in accordance with an example embodiment.

Referring now to FIG. 4, a method 400 is shown for determining an environment, for example using a radar system such as radar system 300. Radio signals are emitted from the antenna 308 using the transmitter 302, reflected radar signals are received from the environment, and feature extraction is performed from the radar signals. In some example embodiments, there is display of the map, features and/or radar data. The data displayed may be a three dimensional map of the environment which may be used for localization of the object on which the radar system is mounted.

First at event 402, the radar system 300 scans an environment along elevation angles at one or more fixed azimuth angles or scans along azimuth angles at one or more fixed elevation angles by transmitting radar signals using one or more of the transmitters 302 and one or more antennas 308. The horizontal plane scanning can be done using beamforming or electrical beam steering, or may be done by mechanical scanning with an antenna 308 configured to rotate in the horizontal and/or vertical planes. For each scan along azimuth angles, the radar scans by performing a conceptual row-by-row scan at a respective fixed elevation angle, for example starting at a zero degree elevation angle as the first horizontal plane of a field of interest and then proceeding to the next fixed elevation angle.

Figure 8:
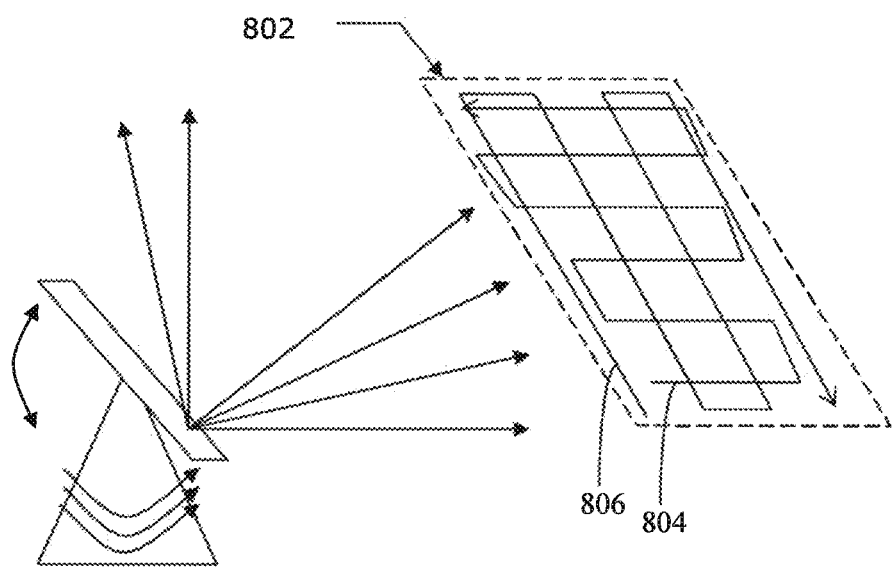
FIG. 8 illustrates an example scanning pattern for a region of interest using a sensing system, in accordance with an example embodiment.

FIG. 8 illustrates an example scanning pattern for a region or field of interest 802 using one of the sensing systems 100, 200 in accordance with an example embodiment. Depending on the field of interest 802, the scanning pattern may be a raster scanning pattern in which the scan is conducted at different fixed elevation angles for example, as shown in FIG. 8. In an example embodiment, a conceptual row-by-row scan 804 may be performed with rotating azimuth angles performed at different fixed elevation angles.

Figure 9:
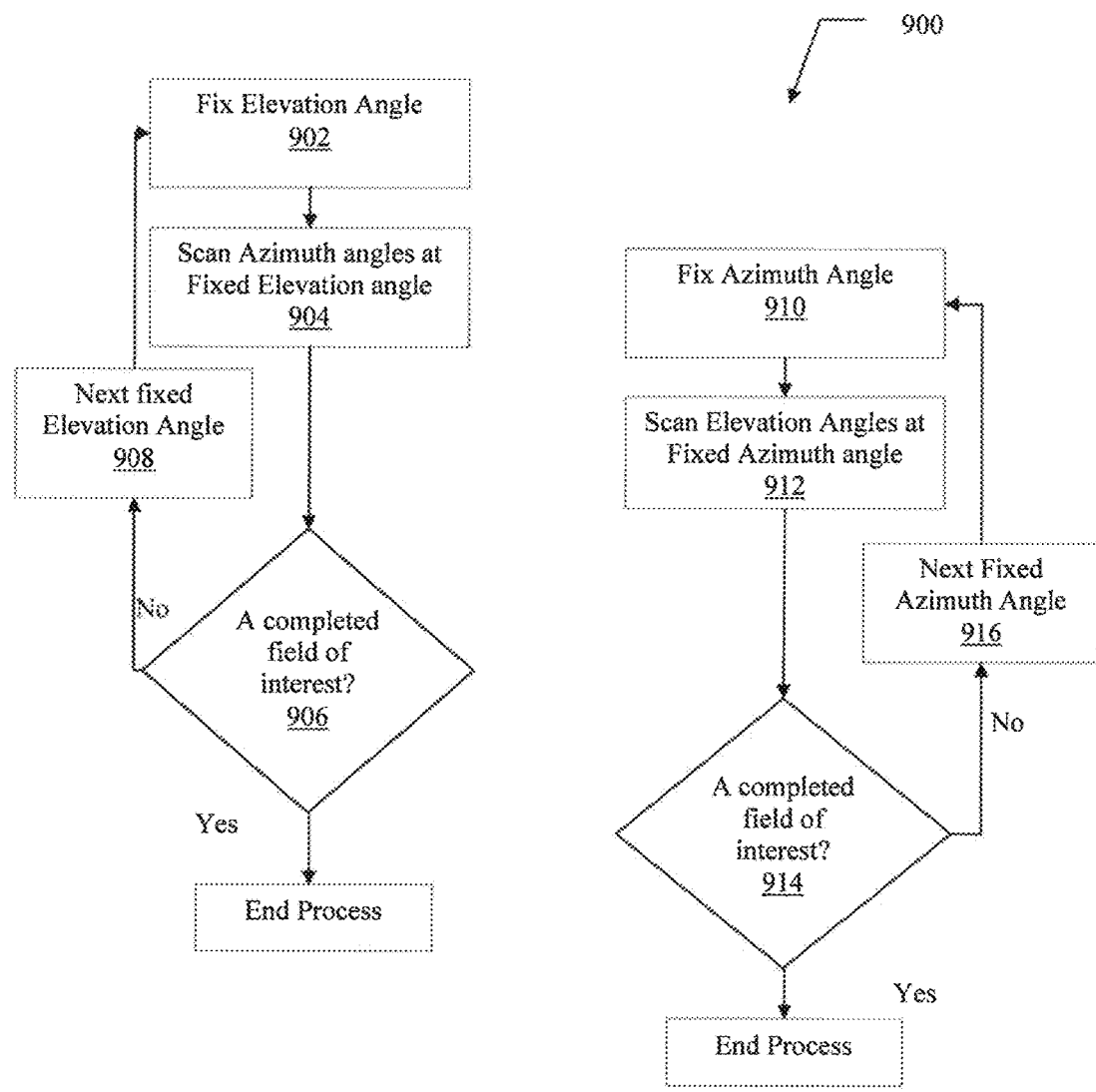
FIG. 9 illustrates a flow diagram for a method of scanning an environment using a sensing system in accordance with an example embodiment.

FIG. 9 illustrates one or more methods 900 of scanning an environment using a sensing system which is mounted to a vehicle, in accordance with an example embodiment. In the method 900, an elevation angle is fixed 902 depending on the application and the field of interest 802 (FIG. 8). The sensing system may then use radar to scan azimuth angles at a fixed elevation angle 904. The azimuth angles may be scanned in a raster pattern as in conceptual row-by-row scan 804 (FIG. 8) or in another suitable pattern including a continuous rotating scan, an always left-to-right scan, or an always right-to-left scan. At event 906, if a completed field of interest has not been scanned, a next fixed elevation angle is chosen 908. The next fixed elevation angle is then fixed 902 and the scan of azimuth angles at the fixed elevation angle 904 is conducted. If a completed field of interest has been scanned by scanning along azimuth angles at one or more fixed elevation angles, the scans further scans along azimuth angles at one or more fixed elevation angles may not be required and the process ended. The fixed elevation angles can vary depending on the field of interest 802 and the application, and may be intervals of for example 5 degrees, 10 degrees or the like. Similarly, in the vertical planes, the radar may scan the same field of interest 802 by performing a conceptual column-by-column scan 806 of the same field of interest 802, for example.

In an example embodiment shown in method 900, in the vertical plane, an azimuth angle is chosen and fixed 910. The radar system may then scan elevation angles at the fixed azimuth angle 912. The elevation angles may be scanned in a conceptual column-by-column scan 806 (FIG. 8) in an up-to-down pattern or in another suitable pattern including a continuous rotating scan, an always up-to-down scan, or an always down-to-up scan. At event 914, if the scan of the field of interest 802 has not been completed, a next fixed azimuth angle is chosen 916. The azimuth angle is then fixed 910 and the scan of elevation angles at the fixed azimuth angle 912 is conducted. If a completed field of interest has been scanned by scanning along elevation angles at fixed azimuth angles, further scans may not be required, and the process ended.

The next vertical plane scan may then be performed by varying the fixed azimuth angle of the scan using a pan tilt unit or mirror scanning technique, or other technique. Depending on the field of interest 802, the emission angle may proceed to the next fixed azimuth angle, wherein the next vertical plane scan is performed along elevation angles on the next part (column in this conceptual case) of the field of interest 802. The antenna 308 may also be electrically steered, for example using phase shifting or frequency shifting, as is understood in the art to perform the environmental scans along azimuth angles at one or more fixed elevation angles and/or vertical planes at one or more fixed azimuth angles.

In method 900, the scan of azimuth angles at one or more fixed elevation angles and the scan of elevation angles at one or more fixed azimuth angles may be conducted consecutively and the order in which the scans is completed may also be varied. The method 900 can be performed in a loop and may also be performed iteratively, in an example embodiment.

In an example embodiment, the field of interest 802 can be a partial sector, a region, and/or a targeted specific object (dynamic or static), for example. In another example embodiment, the field of interest 802 is a hemisphere (e.g., zero degrees to 90 degrees elevation) which can be for ground-based vehicles, for example. In another example embodiment, a 360 degree scan of the entire surrounding environment is performed (e.g., full spherical scan). The vertical scans and the horizontal scans can have partial sharing of a field of interest 802 in some example embodiments. The illustrated raster pattern shows a continuous back-and-forth scan. In some example embodiments, other suitable scans for the horizontal plane scan include a continuous rotating scan, an always left-to-right scan, or an always right-to-left scan. In some example embodiments, other suitable scans for the vertical plane scan include a continuous rotating scan, an always up-to-down scan, or an always down-to-up scan.

In some example embodiments, reference to azimuth and elevation angles can be replaced with first angular coordinates and second angular coordinates from an applicable observer, wherein the first angular coordinates are perpendicular to the second angular coordinates. For example, for a field of interest 802, scanning can be performed along the first angular coordinates while fixing the second angular coordinate. Further scanning can be performed along the first angular coordinates for different respective fixed second angular coordinates for the field of interest 802. For the same field of interest 802, scanning can be performed along the second angular coordinates while fixing the first angular coordinate. Further scanning can be performed along the second angular coordinates for different respective fixed first angular coordinates for the field of interest 802. In some example embodiments, reference to horizontal planes and vertical planes can be replaced with first planes (axes) and second planes (axes), wherein the first planes (axes) are perpendicular to the second planes (axes). These scans can be performed consecutively or simultaneously, for example.

Referring again to FIG. 4, reflected radar signals or data are captured or received by one or more radar receivers at event 404. The radar data is transferred to a controller for image processing 406. The radar data can be processed at event 406 to form a three dimensional point cloud or a radar image of the surrounding environment. To generate a three dimensional map 408, events 402 and 404 may be repeated as multiple surveys of the same environment and may improve detail on the environment being gathered. A decision event 410 may be included wherein the sensing system 100 may include a dynamic object removal event 412 that removes dynamic objects from the data processed at event 406. The three dimensional map can then include only the static objects in the environment, in an example embodiment. Whether event 412 is performed will depend on the application. For instance, in applications where there are no dynamic objects such as parked or moving cars within an environment, event 412 may be omitted and the processing event 406 may be performed immediately after event 404. The three dimensional map generated at event 408 after processing event 406 may be used to perform object localization 414 of an object within the environment. The three dimensional map generated at event 408 may also be displayed at event 416. Event 416 may include display of the three dimensional map on a display unit such as a computer or other display unit capable of displaying the signals processed by the scanning event 402.

The scanning event 402 can be done using radar systems that use electrical beam steering and scanning along azimuth angles at one or more fixed elevation angles and vertical planes at one or more fixed azimuth angles or may use a combination of electrical beam scanning and mechanical scanning. For example, electrical beam scanning is used for scanning in the vertical planes at one or more fixed azimuth angles, and mechanical scanning is used for scanning along azimuth angles at one or more fixed elevation angles, or vice versa. The radar system 300 used in scanning event 402 may scan perform the scans sequentially. In some embodiments, scanning may be performed concurrently.

Figure 5:
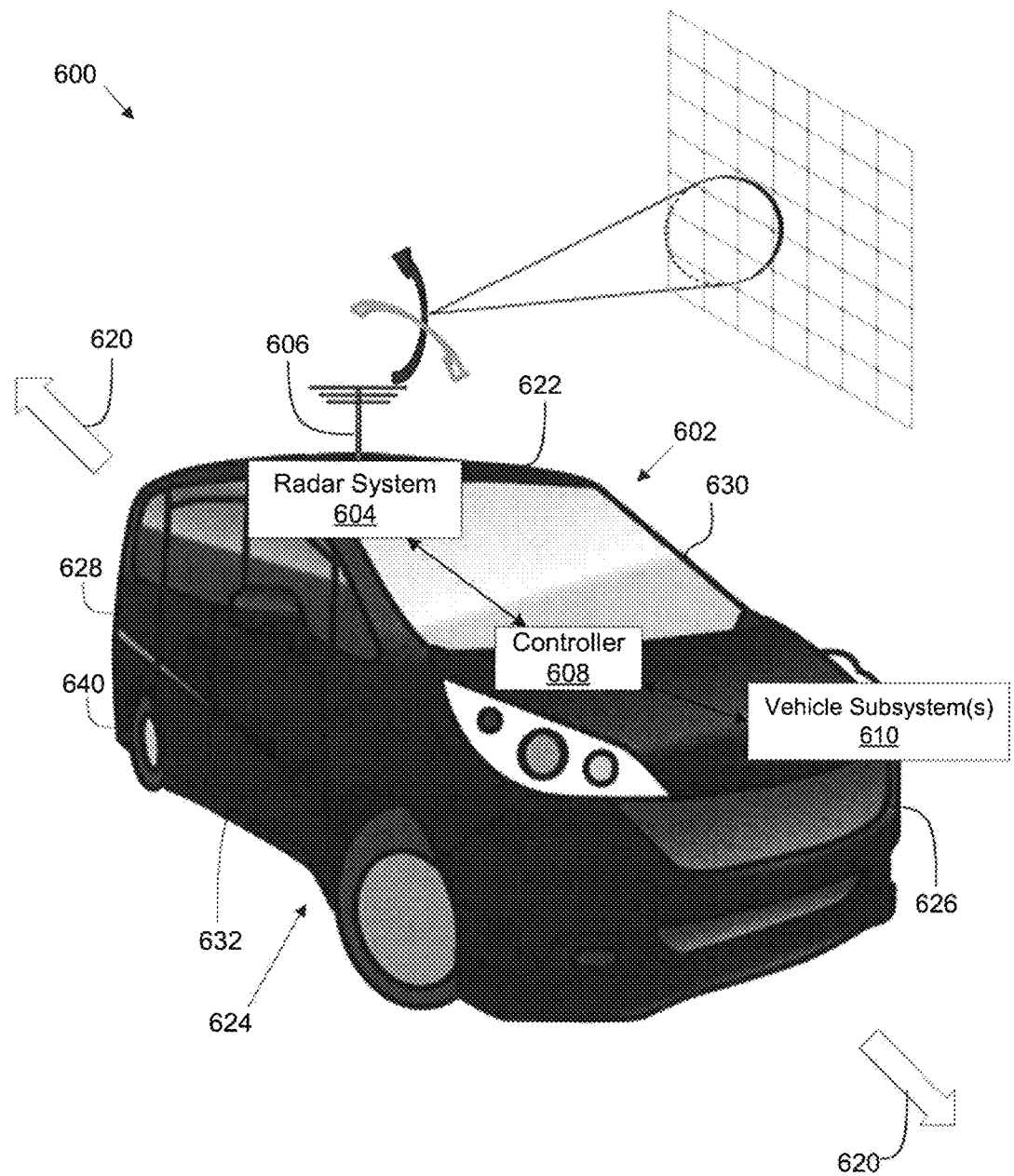
FIG. 5 shows a right perspective diagrammatic view of an example sensing system for a vehicle, in accordance with an example embodiment.
Figure 6:
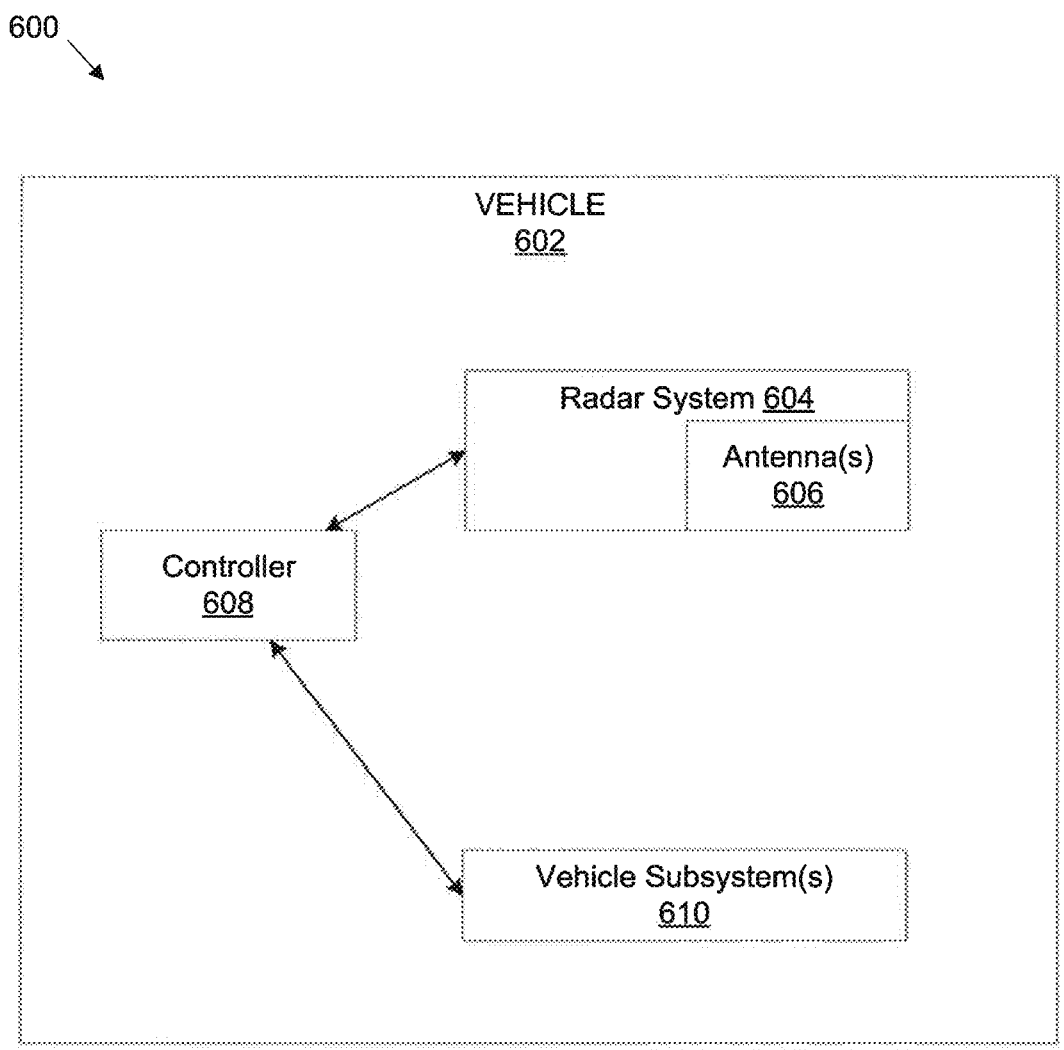
FIG. 6 illustrates a block diagram of the system shown in FIG. 5.

FIG. 5 shows a perspective diagrammatic view of an example sensing system 600 including a vehicle 602 with at least associated one radar system 604, in accordance with an example embodiment. FIG. 6 shows a block diagram of the sensing system 600. As shown in FIG. 5, the vehicle 602 can be an automobile in an example embodiment, and the sensing system 600 includes at least one antenna 606 or radar system 604 mountable on the vehicle 602. In an example embodiment, the radar system 604 can be part of at least one of the sensing systems 100, 200 described above, and can be controlled to operate in a manner of at least one of the processes 400, 700, for example. Each antenna 606 can also represent suitable positions for any radar emitting/sensing system, in accordance with example embodiments. In an example embodiment, the radar system 604 is not necessarily permanently mounted to vehicle 602, and in some example embodiments may be mounted or removed from vehicle 602 as necessary.

Generally, the sensing system 600 can be used for localization and mapping of the surrounding environment when the vehicle 602 is moving. For example, scanning along azimuth angles at one or more fixed elevation angles and vertical plane scanning at one or more fixed azimuth angles can be performed, in accordance with example embodiments. The map can comprise at least one of a 3D map, 3D point cloud map, or radar image. The generated 3D map can be stored to memory such as memory 313 or may be used to build upon previous maps or future maps, or sent to a remote device, for example. The location of the vehicle 602 within the 3D map or radar image can also be determined using the radar system 604.

The sensing system 600 further includes at least one controller 608 which is operably connected to components of the radar system 604. The controller 608 can include at least one processor (such as a microprocessor) and memory such as memory 313 having stored thereon instructions, programs and applications executable by the processor. The sensing system 600 may also include other vehicle subsystems 610 which are operably connected to the controller 608.

The vehicle subsystems 610 can include resident in-vehicle subsystems, input subsystems, output subsystems, electrical subsystems and electro-mechanical subsystems. The controller 608 can be configured to receive and send data from and to the radar system 604, the vehicle subsystems 610. The controller 608 may include at least one data recording process for storing data captured from the radar system 604 and/or the vehicle subsystems 610, and/or data processed therefrom.

In an example embodiment, a vehicle subsystem 610 can receive a command from the controller 608 in order to perform the particular command based on data detected by the radar system 604. In an example embodiment, data or map information is sent to the vehicle subsystem 610, such as information in relation to the static environment, a static object or a dynamic object. The data can also include the identification of the object, and can include other pertinent information about the object such as its speed and vector. The vehicle subsystem 610 can be configured to, in an example embodiment, receive and interpret that received data and execute its own command function in response. Some vehicle subsystems 610 can include output subsystems (e.g. displays, monitors, projectors, and/or speaker output, etc.) which include pertinent data about a detected object or environment, or a specified action or command to be taken by the driver or another vehicle subsystem 610. Some vehicle subsystems 610 can include input subsystems, such as touchscreen, microphone for voice input, steering control, and/or pedal control, etc.

Time of flight of the radio waves can be used to determine environment and objects around the vehicle 602. The determination of environment and objects can further be calculated based on the speed, vector, and location of the vehicle 602, along with other information known to the controller 608. For example, speed, vector and location information of the vehicle 602 can be determined from speedometers and/or GPS. Therefore, the absolute or relative speed of other objects can be determined, including their direction of travel. As well, the location of other objects and environment can be determined. Doppler effects based on the relative speed of the vehicle 602 can also be used as part of the calculations, as would be understood in the art.

As shown in FIG. 5, the vehicle 602 is configured to move in a direction of travel 620, for example using a motor drive and wheels in the case of an automobile to move horizontally forward or backward, in various paths to arrive at a destination. As shown in FIG. 5, the body of the vehicle 602 includes a top 622, bottom 624, front side 626 and rear side 628. The vehicle 602 left side 630 and right side 632 which are transverse to the front side 626 and the rear side 628. The front side 626 and rear side 628 are in-line with the direction of travel 620, for example in the case of an automobile when the vehicle 602 is moving forwards or backwards. Other types of ground-based vehicles 602 may have other axes or directions of travel 620, not shown here, in other example embodiments.

As shown in FIG. 5, at least one of the antennas 606 or radar systems is mounted on the top 622 of the vehicle 602. This can facilitate scanning in multiple directions, such as horizontal scanning and vertical scanning, for example. In other example embodiments, at least one of the antennas 606 or radar systems is mounted on or at the rear side 628 of the vehicle 602. In other example embodiments, antennas 606 or radar systems are mounted on both sides 630, 632 of the vehicle 602, to collectively detect electromagnetic radiation in regards to the surroundings. These mounting positions can be used for generation of 3D maps based on readings taken when the vehicle 602 is moving, for example. In an example embodiment, the antenna 606 or radar system is mounted exterior to the vehicle body.

The vehicle 602 can comprise a shell which generally surrounds the vehicle 602. In an example embodiment, at least part of the shell can be formed of radio wave transmissive material such as rubber, plastic, composite or polymer. In such an embodiment, the antenna 606 or radar system is mounted interior to the radio wave transmissive material. This protects the antenna 606 or radar system from environmental factors and still permits radio waves to be transmitted and received through the material of the shell. An example location for this material can be interior to or within a bumper 640, such as the bumper 640 at the rear side 628. Other suitable areas of the vehicle 602 include a roof or additional roof cover at the top 622 which is formed of such material. Another example area of the shell is at the left side 630 and the right side 632, for example at a middle portion or lower bumper area, and at least two antennas 606 or radar systems are used in this case. This contrasts with light-based detection systems which would be typically blocked by the shell of the vehicle 602.

The vehicle 602 can, in example embodiments, be ground-based including an automobile, truck, tractor, bus, motorcycle, locomotive, subway, hovercraft, snowmobile or heavy equipment vehicle. The vehicle 602 can further include an Inertial Measurement Unit (IMU), not shown, as one of the vehicle subsystems 610 to determine its own inertial forces, and to co-ordinate inertial data with the detection radar information, in an example embodiment.

In some example embodiments, the vehicle 602 comprises a fully autonomous vehicle or a semi-autonomous vehicle. Safety is an important goal in autonomous vehicles. Therefore, more robust and reliable sensors and methods should be used. Further, it is important for automotive industry to reduce the cost by reducing the number of sensors in the autonomous vehicles. Since radar is one of the major components in autonomous vehicles for object detection, in example embodiments, adding more capabilities like localization and 3D sensing and imaging can be assistive and can help radar to replace or reduce the number of other sensors in autonomous vehicles, e.g., doing more with less sensors.

In an example embodiment, the autonomous vehicle 602 is configured to sense its environment and navigate without human input.

The vehicle 602 can be equipped with further sensory systems for detecting surrounding static environment or dynamic objects. The vehicle subsystems 610 can include further sensory devices in addition to radar, such as LIDAR, vision-based systems, ultrasound, speedometers, IMU, odometers, and GPS.

In an example embodiment, at least some or all aspects of the controller 608 are performed by at least two controllers. For example, some of the logic may be distributed to a resident controller 312 (FIG. 3) of the radar system 604 and/or a resident controller of one of the vehicle subsystems 610. Some of the processing may be distributed so that the controller 608 is primarily responsible for higher level monitoring, control, and command, while the other controllers have specific task functions. This allows, for example, the radar system 604 or vehicle subsystem 610 to perform its own responses at a faster rate or to perform its own local control or loop functions. The controller 608 would still be able to perform higher level functions and commands, such as localization, mapping and navigation, for example by continuously performing the described example method(s).

Figure 7:
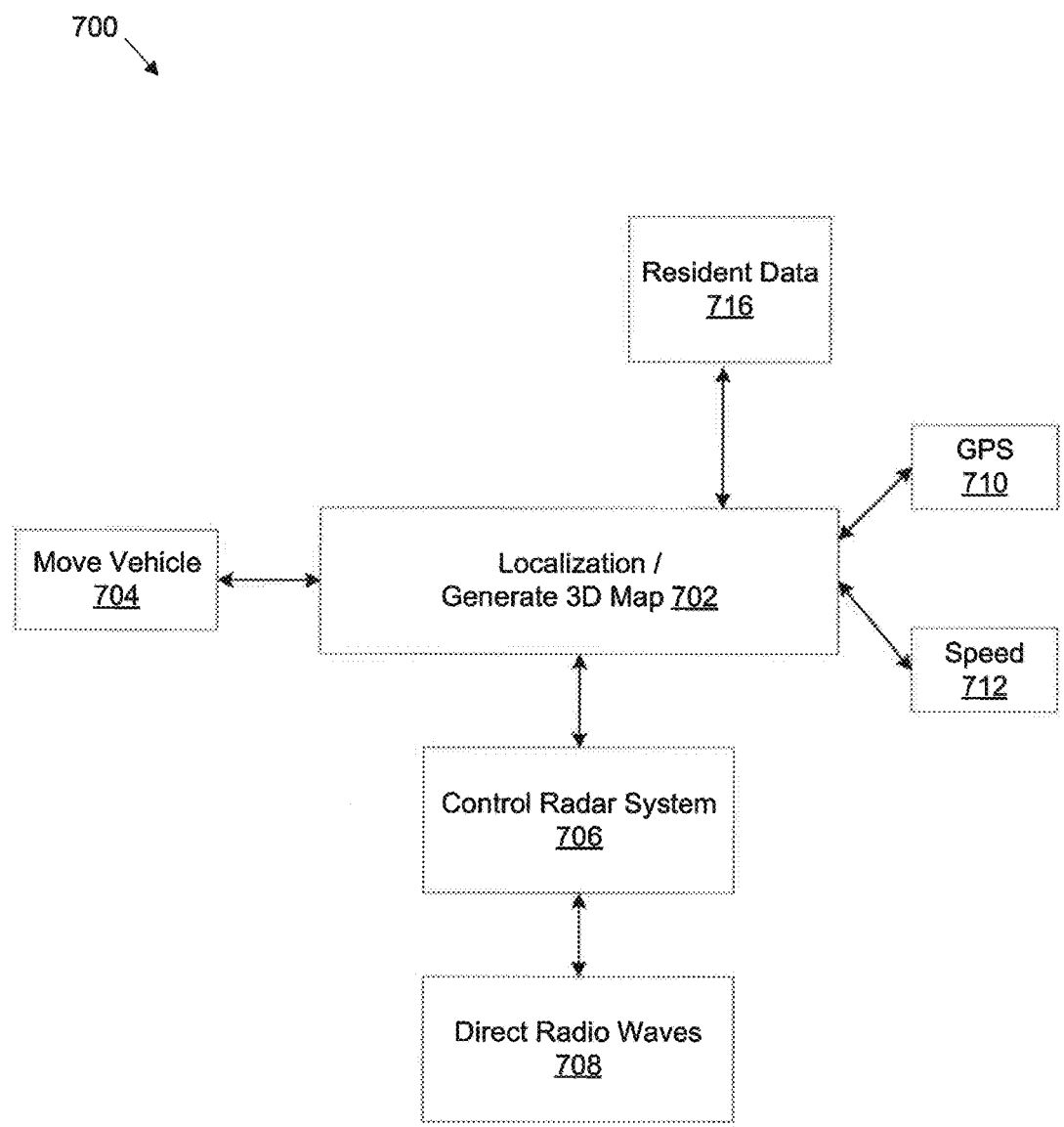
FIG. 7 illustrates a process diagram for localization and generation of a 3D map using the sensing system of FIG. 5, in accordance with an example embodiment.

Reference is now made to FIG. 7, which illustrates a process 700 for localization and generation of a 3D map using the radar system 600, in accordance with an example embodiment. Some or all of the process 700 can be performed by the controller 608, in an example embodiment. The process 700 can be performed dynamically in real-time in an example embodiment. At event 702, the 3D map is generated based on some or all of the events shown in the process 700, and localization of the vehicle 602 is used to generate a position of the vehicle 602 within the 3D map of static environment. In some example embodiments, the 3D map is sent to a remote device and/or data is sent to a remote device which generates the 3D map. At event 704, the vehicle 602 is controlled to be moved for example either manually, semi-autonomously or autonomously. The vehicle 602 is moved in the direction(s) of travel 620 in order to arrive at a desired destination. At event 706, the radar system 604 is activated so that radio waves are transmitted and electromagnetic radiation is received, for example. At event 708, activating the radar system 604 can include directing the radio wave(s) being transmitted, for example in a vertical scanning pattern and horizontal scanning pattern in accordance with example embodiments, or in a fixed direction when appropriate.

Additional information can be used to correlate the speed, vector and location of the vehicle 602 with the received electromagnetic radiation in order to generate the 3D map and for localization of the vehicle 602. For example, at event 710 positioning information and speed information can be received from a GPS or other suitable device, for example to correlate such information. For example, at event 712 speed information can be received from a speedometer.

Resident data can be accessed from resident memory at event 716. Any accessed data can include a library which contains additional map or object information, including previously known maps. Accessed data can be used to identify specific shapes as identifiable objects, such as traffic signs, traffic lights, buildings, trees, curbs, rocks, etc.

Static and dynamic objects and the static environment can be identified from events 704, 706, 708, 710, 712, 716. At event 718, data can be further processed to remove the dynamic objects in order to generate a 3D map of the static environment and to assist with localization within the 3D map.

In the described methods or block diagrams, the boxes may represent events, steps, functions, processes, modules, messages, and/or state-based operations, etc. While some of the above examples have been described as occurring in a particular order, it will be appreciated by persons skilled in the art that some of the steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps may be repeated, as necessary. Elements described as methods or steps similarly apply to systems or subcomponents, and vice-versa. Reference to such words as "sending" or "receiving" could be interchanged depending on the perspective of the particular device.

The above discussed embodiments are considered to be illustrative and not restrictive. Example embodiments described as methods would similarly apply to systems, and vice-versa.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A sensing system, comprising:
a ground-based vehicle configured to move in a direction of travel;

at least one radar system mountable to the ground-based vehicle, each radar system configured to emit radio waves in a beam to scan along azimuth angles at different fixed elevation angles or in one or more vertical planes, capture electromagnetic radiation, and generate radar data based on the captured electromagnetic radiation while the vehicle is moving;

memory operably coupled to each radar system to receive the radar data from each radar system and to store the radar data; and a processor operably coupled to the memory, the processor configured to execute computer instructions stored in the memory, the computer instructions causing the processor to:

receive speed information and positioning information of the vehicle from a controller of vehicle while the vehicle is moving;

generate a three dimensional map of an environment surrounding the vehicle based on the radar data received from the memory, the speed information and the positioning information of the vehicle, and the three-dimensional map including objects; and generate a second three-dimensional map of a static environment surrounding the vehicle by identifying dynamic objects from objects included in the three-dimensional map of the environment and removing the dynamic objects from the three-dimensional map.

2. The sensing system of claim 1, wherein the processor is further configured to execute computer instructions stored on the memory to cause the processor to control the at least one radar system to emit radio waves to scan along azimuth angles at one or more fixed elevation angles.

3. The sensing system of claim 1, wherein the processor is further configured to execute computer instructions stored on the memory to cause the processor to control the at least one radar system to emit radio waves to scan in one or more vertical planes at one or more fixed azimuth angles.

4. The sensing system of claim 1, wherein the processor is further configured to execute computer instructions stored on the memory to cause the processor to control the at least one radar system to emit radio waves to scan along azimuth angles at one or more fixed elevation angles in a sequence.

5. The sensing system of claim 1 wherein the processor is further configured to execute computer instructions stored on the memory to cause the processor to control the at least one radar system to emit radio waves to scan the vertical planes at one or more fixed azimuth angles in a sequence.

6. The sensing system of claim 1 wherein the processor is further configured to execute computer instructions stored on the memory to cause the processor to process the radar data to generate 3D point clouds or radar images and wherein the three-dimensional map is generated based on the 3D point clouds or the radar images.

7. The sensing system of claim 1 wherein the processor is further configured to execute computer instructions stored on the memory to cause the processor to control the at least one radar system to scan along azimuth angles at a respective fixed elevation angle.

8. The sensing system of claim 1 wherein the processor is further configured to execute computer instructions stored on the memory to cause the processor to control the at least one radar system to emit a first scan along first azimuth angles and a second scan along second azimuth angles at the different fixed elevation angles.

9. The sensing system of claim 1 wherein the processor is further configured to execute computer instructions stored on the memory to cause the processor to control the at least one radar system to emit each scan in the one or more vertical planes is along elevation angles at a respective fixed azimuth angle.

10. The sensing system of claim 1 wherein the processor is further configured to execute computer instructions stored on the memory to cause the processor to control the at least one radar system to emit a first scan in a first vertical plane and a second scan in a second vertical plane at different fixed azimuth angles.

11. The sensing system of claim 1, wherein the at least one radar system comprising a plurality of radar systems mountable to the vehicle.

12. The sensing system of claim 1 wherein the processor is configured to generate a position of the vehicle based on at least one of the three dimensional map of the environment or the second three dimensional map of the environment.

13. A method for radar sensing from a ground-based vehicle, using at least one radar system mountable to the ground-based vehicle, the method comprising:

controlling each radar system to emit radio waves in a beam to scan along azimuth angles at different fixed elevation angles or in one or more vertical planes;

processing, at each radar system, electromagnetic radiation captured by the radar system to generate radar data while the vehicle is moving;

receiving speed information and positioning information of the vehicle from a controller of vehicle while the vehicle is moving;

generating a three dimensional map of an environment surrounding the vehicle based on the radar data generated by each radar system, the speed information, and the positioning information, the three-dimensional map including objects; and generating a second three dimensional map, of a static environment surrounding the vehicle, by identifying and removing dynamic objects from the objects included in the three-dimensional map.

14. The method of claim 13 wherein said emitting comprises emitting radio waves to scan along azimuth angles at one or more fixed elevation angles.

15. The method of claim 13 wherein said emitting comprises emitting radio waves to scan in one or more vertical planes at one or more fixed azimuth angles.

16. The method of claim 13 wherein said emitting comprises emitting the radio waves to scan along azimuth angles at one or more fixed elevation angles in a sequence.

17. The method of claim 13 wherein said emitting comprises emitting the radio waves to scan the vertical planes at one or more fixed azimuth angles in a sequence.

18. The method of claim 13 further comprising processing the radar data to generate 3D point clouds or radar images, and wherein the three-dimensional map is generated based on the 3D point clouds or the radar images.

19. The method of claim 13 wherein said emitting comprises emitting a first scan along first azimuth angles and a second scan along second azimuth angles at the different fixed elevation angles.

20. A radar sensing system comprising:

at least one radar system mountable to a vehicle, each radar system configured to emit radio waves in a beam to scan along first angular coordinates at one or more fixed second angular coordinates, wherein the first angular coordinates are perpendicular to the second angular coordinates, capture electromagnetic radiation, and generate radar data based on the captured electromagnetic radiation while the vehicle is moving;

memory operably coupled to each radar system to receive and store the radar data generated by each radar system; and a processor operably coupled to the memory, the processor configured to execute computer instructions stored on the memory, the computer instructions causing the processor to:
  receive speed information and positioning information of the vehicle from a controller of vehicle while the vehicle is moving;

process the radar data received from the memory to determine an environment surrounding the vehicle and identify static and dynamic objects around the vehicle;
  generate a three dimensional map of an environment surrounding the vehicle based on the determined environment and the identified static objects.

\* \* \* \* \*